April 7, 1964 R. R. FINE 3,127,828
LAMINATED DISPOSABLE BROILING PADS
Filed Dec. 13, 1962 2 Sheets-Sheet 1
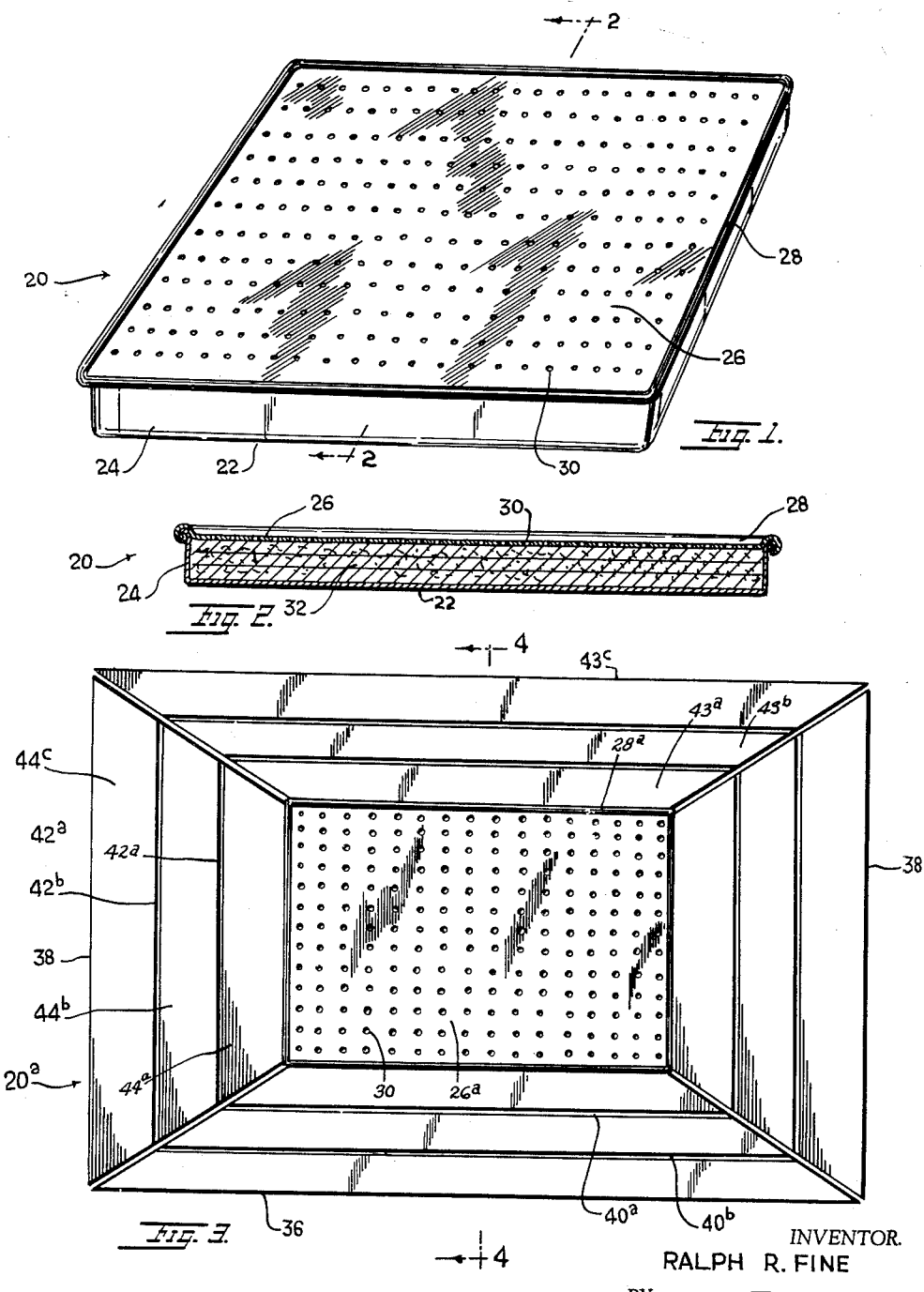
INVENTOR.
RALPH R. FINE
BY
ATTORNEY

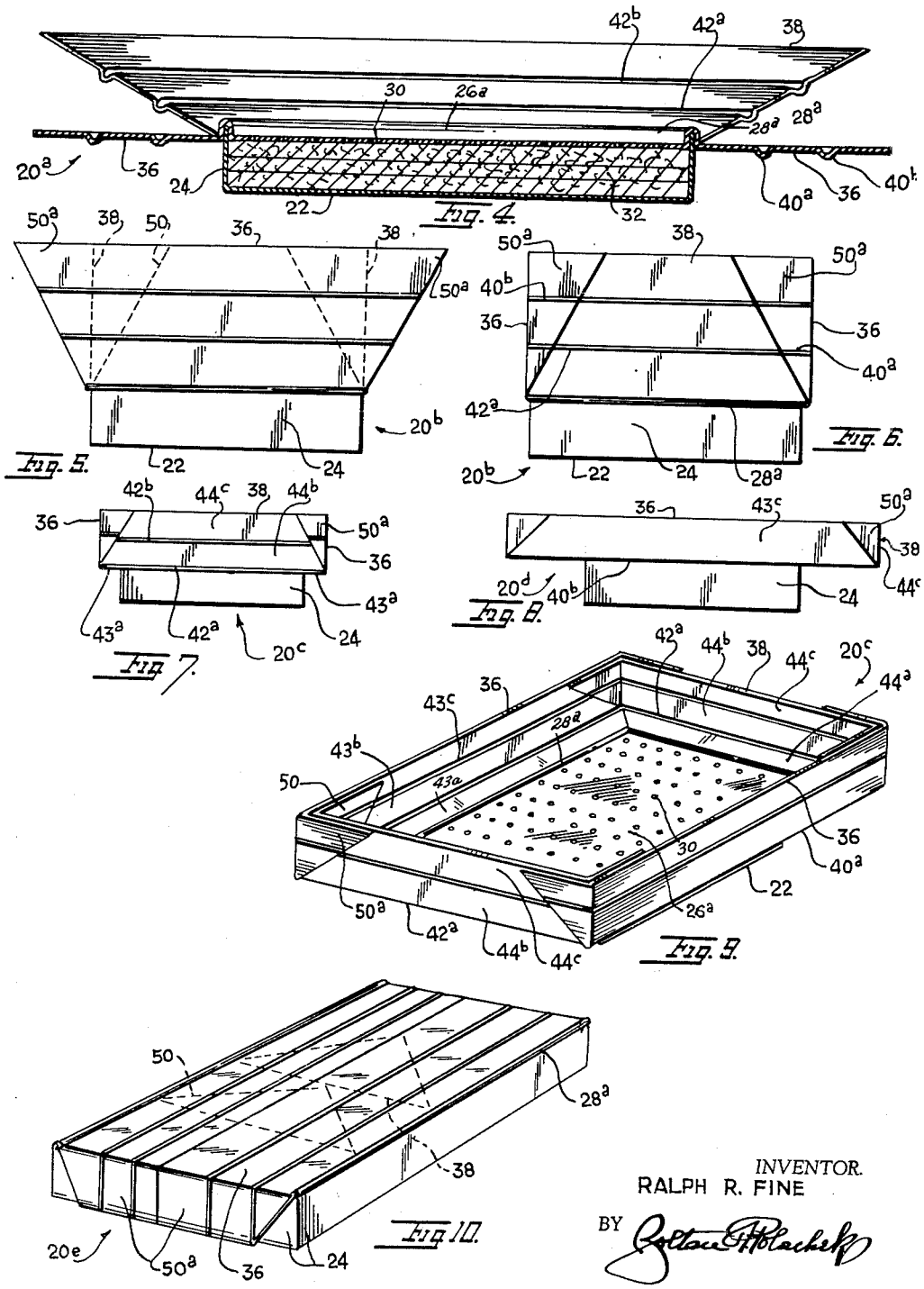

United States Patent Office 3,127,828
Patented Apr. 7, 1964

3,127,828
LAMINATED DISPOSABLE BROILING PADS
Ralph R. Fine, 13—11 146th St., Whitestone, N.Y.
Filed Dec. 13, 1962, Ser. No. 244,521
2 Claims. (Cl. 99—446)

This invention relates to broiling pads and more particularly to a disposable laminated broiling pad having a pair of metal foil layers between which is disposed a plurality of absorbent fibrous layers.

In the broiling of fish, meat, fowl and the like by radiant and other heat directly derived from a gas flame or an electric broiling unit, quantities of juices are driven off during the broiling. Heretofore such juices have been collected in a broiling pan disposed below the food which is being broiled. With most foods the juices driven off and collected in the broiling pan have a high grease content. This greasy material, part of which is solidified, is very troublesome to remove from the pan. In the broiling process, portions of the food and of the juice which is driven off is frequently carbonized and firmly sticks to the pan. To remove this carbonized material from the pan is also very difficult.

It has also heretofore been necessary to turn frequently the food being broiled. The repeated turning of such food is often quite inconvenient.

The present invention is directed at overcoming the above difficulties and disadvantages by providing a disposable broiling pad upon which food can be broiled. The pad has a laminated structure with a plurality of layers of porous, liquid absorbent fibrous material such as paper. Opposite sides of the pad are covered with metal foil. The foil on the upper side of the pad is perforated to permit juices to flow into the interior of the pad where it is absorbed by the fibrous layers. In one form of the invention the perforated foil has scored imperforate extension flaps which may serve as heat reflectors, to improve the broiling operation. The imperforate flaps can be folded over the pad when broiling is done to close the perforated side and retain the juices in the pad. The closed pad can then be conveniently discarded.

It is therefore a principal object of the invention to provide a broiling pad which is a box-like structure having an outer metal foil skin, one side of the structure being perforated to pass juices into the interior of the pad, with a filling of fibrous material in the pad, the filling preferably consisting of a plurality of layers of porous paper.

Another object is to provide a pad as described, wherein the pad has imperforate flaps at its perforated side adapted to be extended upwardly to serve as heat shield and reflector means, to be extended horizontally to serve as food supports, and to be folded over the pad to close the perforated side.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a perspective view of a broiling pad embodying the invention.

FIG. 2 is a sectional view taken on line 2—2 of FIG. 1.

FIG. 3 is a top plan view of another broiling pad according to the invention.

FIG. 4 is a sectional view taken on line 4—4 of FIG. 3, showing the flaps in different open positions.

FIGS. 5–8 are side elevational views on a reduced scale of the pad of FIGS. 3 and 4, with the flaps shown in different positions.

FIG. 9 is a perspective view of the pad of FIG. 7.

FIG. 10 is another perspective view of the pad of FIGS. 3 and 4 with the flaps in closed position.

Referring to the drawings, there is shown in FIGS. 1 and 2, a broiling pad 20 having a flat, rectangular box-like body structure. The pad has a bottom or layer 22 formed of metal foil. The end edges of the pad are bent upwardly to form sides 24 of an open top tray. Upper edges of the sides 24 are rolled and engaged with edges of a flat rectangular upper metal foil layer 26 to form a bead 28 all around the upper edge of the pad. The foil layer 26 has a multiplicity of uniformly distributed holes 30. The holes open into the interior of the pad which contains a porous filling 32 made of fibrous material, preferably porous paper tissue.

In use, the pad can be placed upon the usual broiling pan of a cooking stove, electric broiler unit or the like. The food to be broiled will be placed upon the perforated side of the pad. The juices of the broiling food will run down into the fibrous filling of the pad and will be absorbed thereby. The bead 28 will prevent juices from running off the pad. The metal foil, which is preferably bright, smooth metal such as aluminum, will reflect and conduct heat to the underside of the food on the pad so as to minimize the number of times the food must be turned to be broiled equally on all sides. After the broiling is completed, the entire pad can be discarded. This makes unnecessary the prior task of cleaning grease, food juices, and carbonized material from the broiling pan, since the pad has taken up all the juices and grease and all the carbonized material has collected on the pad.

FIGS. 3 and 4 show another pad 20$^a$ in which parts corresponding to those of pad 20 are identically numbered. The pad 20$^a$ has an open top tray defined by a bottom foil layer 22 with turned up sides 24. Inside the tray is filling 32. The upper edges of sides 24 are engaged in a U-shaped bead 28$^a$ formed all around the periphery of the perforated portion of upper metal foil layer 26$^a$. Layer 26$^a$ has holes 30 uniformly distributed throughout. Layer 26$^a$ has imperforate lateral flaps 36 and end flaps 38. These flaps are generally trapezoidal. Each flap has a pair of parallel scored lines 40$^a$, 40$^b$ or 42$^a$, 42$^b$ formed between and parallel to outer free edges of the flaps and portions of bead 28$^a$. The scored lines define three narrow panels 43$^a$, 43$^b$, 43$^c$ and 44$^a$, 44$^b$, 44$^c$ in each flap.

FIG. 3 shows the flaps in flat coplanar extended position. In FIG. 4 end flap 38 is shown folded upwardly while lateral flaps 36 are horizontal.

FIG. 5 shows pad 20$^b$ in which lateral flaps 36 are vertically disposed. End flaps 38 are also vertically disposed and their corners 50 are folded inwardly. FIG. 6 is a further development from that of FIG. 5 and shows an end elevational view of the pad 20$^b$ rotated 90° from that of FIG. 5. Corners 50$^a$ of flaps 36 are folded or bent around the ends of flaps 38 to form reinforced rectangular corners. The pad 20$^b$ thus has a complete upright vertical box-like extension with open top. The vertically disposed flaps serve as heat reflectors. They also serve to collect grease and food juices which may otherwise tend to spatter from the food being broiled.

FIGS. 7 and 9 are different views of another pad structure 20$^c$ in which the flaps 36, 38 have panel portions 43$^a$, 44$^a$ horizontally disposed to define horizontal extensions of the upper layer 26$^a$ of the pad. The remaining portions 43$^b$, 43$^c$ and 44$^b$, 44$^c$ of the flaps are bent vertically upwardly on scored lines 40$^a$, 42$^a$ to form an enclosed vertical extension of the pad. This arrangement of the pad will support a larger item of food to be broiled than pads 20 or 20$^b$. Corners 50, 50$^a$ of the flaps are folded to reinforce the corners of the box-like vertical extension of the pad.

FIG. 8 shows another pad 20ᵈ in which the pad structure is further horizontally extended at its sides and ends by disposing panel portions 43ᵃ, 43ᵇ and 44ᵃ, 44ᵇ horizontally while panel portion 43ᶜ, 44ᶜ are vertical and form a rectangular box-like extension with open top for the pad. Corners of the flaps are folded at the corners of the vertical extension of the pad. Pad 20ᵈ will support a still larger item of food than the other forms of pads but the vertical walls of the vertical extension will be shorter and will have only single panel portions 43ᶜ, 44ᶜ.

FIG. 10 shows how end flaps 38 can be folded inwardly over the perforated top of the pad 20ᵉ and lateral flaps 36 can then be folded over the end flaps to completely close the pad. The ends of the angular end corners 50ᵃ of the flaps 36 will be folded down and around the ends of the closed pad. If desired, pads can be merchandised in this closed position and the flaps can be opened to any of the positions of FIGS. 3–9 for use. After use the flaps can be folded back to the closed position of FIG. 10, and the used grease and juice saturated pad can be discarded. Flaps 36 have widths which are half the width of the pad and flaps 38 have widths which are half the length of the pad. This facilitates folding and closing.

The invention thus makes it possible to broil food in a quicker, cleaner, and more satisfactory way. Spattering is reduced. Turning of food during broiling is practically eliminated. Excess juices and grease are collected in an efficient, thorough and sanitary manner. Cleaning of broiler pans is made unnecessary.

The broiler pads can be very inexpensively manufactured from cheap, readily available materials. They can be merchandized in packages of several pads. The used pads are readily discarded after use.

While I have illustrated and described the preferred embodiments of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A broiling pad comprising a first metal foil sheet folded to form a generally box-like shallow tray with flat bottom, upright side and end walls and open top, a flat rectangular second metal foil sheet overlaying the tray and having flaps extending outwardly beyond said walls respectively, said second sheet having a rectangular inner portion peripherally secured to edges of said side and end walls to define a continuous bead, said inner portion of the second sheet having a multiplicity of holes distributed uniformly throughout to pass food juices therethrough, and a filling of porous material disposed inside the tray between the first and second sheets to absorb said food juices, said flaps being foldable over said inner portion of the second sheet to cover the holes therein and retain said food juices inside the tray, each of said flaps being generally trapezoidal in form to define overlapping angular corners when the flaps are extended vertically upward from said bead, said filling being formed by a plurality of layers of paper, each of said flaps having parallel score lines to facilitate folding the flaps or forming horizontal and vertical extensions of said tray, said score lines serving the additional function of rigidifying and strengthening the tray.

2. A broiling pad comprising a first metal foil sheet folded to form a generally box-like rectangular tray with flat bottom, upright side walls and open top, a flat rectangular second metal foil sheet overlying the tray and having pairs of flaps extending outwardly beyond said walls respectively, said second sheet having a rectangular inner portion peripherally secured to edges of said side walls to define a continuous bead, said inner portion of the second sheet having a multiplicity of holes distributed uniformly throughout to pass food juices therethrough, and a filling of porous material disposed inside the tray between the first and second sheets to absorb said food juices, said flaps foldable over said inner portion of the second sheet to cover the holes therein and retain said food juices inside the tray, each of said flaps generally trapezoidal in form to define overlapping angular corners when the flaps are extended vertically upward from said bead, said filling constituted by a plurality of layers of paper, each of said flaps having parallel score lines to facilitate folding the flaps for forming horizontal and vertical extensions of said tray, one pair of said flaps at opposite ends of the tray having widths substantially equal to one half the length of the tray, another pair of said flaps at opposite sides of the tray having widths substantially equal to one half the width of the tray, whereby the tray may be completely closed by folding the flaps over said inner portion of the second sheet and then folding the angular corners of either pair of said flaps under the tray, said score lines serving the additional function of rigidifying and strengthening the tray.

References Cited in the file of this patent

UNITED STATES PATENTS

| | | |
|---|---|---|
| 1,301,197 | Tully | Apr. 22, 1919 |
| 1,819,660 | Stone | Aug. 18, 1931 |
| 2,593,592 | Miller | Apr. 22, 1952 |
| 2,875,683 | Burns | Mar. 3, 1959 |